Patented Sept. 18, 1928.

1,684,739

UNITED STATES PATENT OFFICE.

LE ROY HIMES MINTON, OF METUCHEN, NEW JERSEY.

MANUFACTURE OF ZIRCON REFRACTORIES.

No Drawing.   Application filed June 27, 1925. Serial No. 40,099.

This invention relates to the manufacture of refractories of zircon. Zircon or zirconium silicate, $ZrSiO_4$, is not only highly refractory and hence suitable for use in furnace linings and places where exceedingly high temperatures must be withstood, but it is also relatively inert at high temperatures and therefore is excellently adapted for use in metallurgical processes where the refractory must not only withstand high temperatures without deformation, but must also withstand the corrosive action of molten slags and metals. Unfortunately, however, zircon is exceedingly difficult to mold and handle in the unburned condition and no one has heretofore, so far as I am aware, succeeded in molding it into the necessary shapes. Thus, up to the time of my invention it had been impossible fully to take advantage of the remarkable refractory properties of this material. According to the present invention I have provided a method whereby zircon can be molded into bricks, crucibles and the various special shapes required of refractories, handled in the unburned condition, and fired to produce a hard, strong true product which can be readily used wherever refractories of this nature are needed.

In carrying out my invention I finely grind a portion of zircon in the presence of a deflocculent, add coarser zircon, make the mixture moldable by the addition of a gum or fixative, mold the resultant mass to the required shapes, dry them and fire to a temperature high enough to sinter the zircon. As a specific example of the manufacture of zircon refractories under the present invention the following is given:

I take natural zirconium silicate, or zircon, of approximately 100 mesh and finer, known in the trade as "fine", and grind it in a ball mill with water containing from one-tenth to two percent tannic acid, continuing the grinding until the zircon is very finely ground. Lignin, gallo-tannic acid, gallic acid or other similar organic deflocculents might be substituted for the tannic acid. To one part of this ground material I then add one part of "fine" zircon and two parts of a granular zircon, of 40 mesh and coarser and mix the whole. In making up small quantities of the refractory this mixture is then dried and a semi-dry moldable batch made by adding from two to ten percent by weight of water containing one-half to two percent of dextrine, the amount varying with the molding pressure to be applied. Other gums or organic fixatives or binders such as tragacanth, arabic, tar, molasses, prepared fixatives, such as "glutrin" etc., might be substituted for the dextrine. Where the refractory is made in large quantities and it is not feasible to dry the ground batch the amount of water in the batch is calculated and the proper amount of water added with the fixative accordingly. After the fixative is added, the batch is thoroughly mixed in a suitable mixer, preferably one of the Werner & Pfeidler type, and the moist material then pressed into shape in a power press or by hand. When a hand press is used with relatively light pressures and a relatively large percentage of fixative used, care should be taken when the shapes are removed from the mold or die to place a sheet of paper between them and the drying pallet, as otherwise the shapes will stick to the pallet. When a power press is used and relatively little binder, this precaution is not necessary.

After drying the shapes are hard and firm and may be readily handled and set in the kiln without danger of fracture. The shapes are then fired to a temperature high enough to sinter them and make them strong enough to be shipped and used without chipping or breaking. I have fired these shapes to about cone 10, approximately 2430° F. in as short a time as 15 hours and to cone 8 or 9, approximately 2390° F. in from 96 to 144 hours with equally good results. Higher temperatures may be employed for special products.

By means of the above described method I have been enabled to produce wholly satisfactory bricks and other shapes which are made entirely of zircon. By omitting the specific molding step and adding sufficient water I can make a paste to be used as a cement for refractory uses. Such a cement is admirably adapted for use at high temperatures not only because of its refractory properties and its inertness at high temperatures, but because of the low shrinkage of zircon. When tannic acid or its equivalent is employed as described above, this cement also has a very high binding strength in the dry and unfired state. The proportions given above have been found by actual experiment to give satisfactory results; however, a reasonable variation is permissible and to be expected.

I claim:

1. The method of making zircon refractories which comprises finely grinding zircon in the presence of water containing an organic deflocculent, adding granular zircon and an organic binder, and shaping and firing the resultant product.

2. The method of making zircon refractories which comprises finely grinding zircon in the presence of water containing tannic acid, adding granular zircon, making a semi-dry batch of the mixture by the addition of dextrine, and shaping and firing the resultant product.

3. The method of making zircon refractories which comprises grinding zircon in the presence of water containing from one-tenth to two percent tannic acid, adding one part of unground zircon of about 100 mesh fineness and two parts of granular zircon of about 40 mesh fineness, making up a semi-dry batch by adding from two to ten percent by weight of a water solution containing from one-half to two percent of dextrine based on the weight of the water, mixing the batch, molding it, and firing the resultant shape to sinter the zircon.

4. The method of making a refractory cement which comprises finely grinding zircon in the presence of water containing an organic deflocculent, adding granular zircon and an organic binder, and making a paste of the mixture.

5. A molded refractory shape made by finely grinding zircon in the presence of water containing an organic deflocculent, molding the mixture and firing the shape to sinter the zircon.

6. The method of making zircon refractories which comprises finely grinding zircon in the presence of water containing an organic deflocculent, adding granular zircon, and shaping and firing the resultant product.

7. The method of making zircon refractories which comprises finely grinding zircon in the presence of water containing an organic deflocculent, adding granular zircon and a binder, and shaping and firing the resultant product.

In testimony whereof I affix my signature.

LE ROY HIMES MINTON.